United States Patent
Guen et al.

(10) Patent No.: US 10,673,055 B2
(45) Date of Patent: Jun. 2, 2020

(54) SECONDARY BATTERY

(71) Applicant: SAMSUNG SDI CO., LTD., Yongin-si, Gyeonggi-do (KR)

(72) Inventors: Minhyung Guen, Yongin-si (KR); Yongchul Seo, Yongin-si (KR); Seungho Kwak, Yongin-si (KR)

(73) Assignee: Samsung SDI Co., Ltd., Yongin-Si, Gyeonggi-Do (KR)

( * ) Notice: Subject to any disclaimer, the term of this patent is extended or adjusted under 35 U.S.C. 154(b) by 479 days.

(21) Appl. No.: 14/946,803

(22) Filed: Nov. 20, 2015

(65) Prior Publication Data

US 2016/0336574 A1 Nov. 17, 2016

(30) Foreign Application Priority Data

May 15, 2015 (KR) .................. 10-2015-0067956

(51) Int. Cl.
*H01M 2/26* (2006.01)
*H01M 2/06* (2006.01)
*H01M 2/04* (2006.01)

(52) U.S. Cl.
CPC ........... *H01M 2/26* (2013.01); *H01M 2/0482* (2013.01); *H01M 2/06* (2013.01)

(58) Field of Classification Search
CPC ........ H01M 2/06; H01M 2/26; H01M 2/0482; H01M 2/0217; H01M 2/0473; H01M 2/647; H01M 2/1061
USPC ....................................................... 429/179
See application file for complete search history.

(56) References Cited

U.S. PATENT DOCUMENTS

| | | | |
|---|---|---|---|
| 2010/0086845 A1* | 4/2010 | Jung ................... | H01M 2/0215 429/178 |
| 2011/0076528 A1 | 3/2011 | Lim | |
| 2011/0097613 A1* | 4/2011 | Kim ..................... | H01M 2/043 429/53 |
| 2011/0129725 A1 | 6/2011 | Baek | |
| 2012/0009451 A1 | 1/2012 | Yoo | |

(Continued)

FOREIGN PATENT DOCUMENTS

| | | |
|---|---|---|
| CN | 202454638 U | 9/2012 |
| JP | 2008-204770 A | 9/2008 |

(Continued)

OTHER PUBLICATIONS

USPTO Office action dated Sep. 22, 2017, in U.S. Appl. No. 15/227,833.

(Continued)

*Primary Examiner* — Michael H. Wilson
(74) *Attorney, Agent, or Firm* — Lee IP Law, PC (57) ABSTRACT

A secondary battery, including a case including an internal space; an electrode assembly in the case, the electrode assembly having a current collection tab drawn from a positive electrode plate, a current collection tab drawn from a negative electrode plate, and a separator between the positive electrode plate and the negative electrode plate; an electrode terminal electrically connected to each of the current collection tab; an insulation plate between the electrode assembly and the electrode terminal; and a cap plate exposing the electrode terminal, the cap plate sealing the case, the insulation plate including one or more protrusions on a surface facing the cap plate.

13 Claims, 4 Drawing Sheets

(56) References Cited

U.S. PATENT DOCUMENTS

| | | | |
|---|---|---|---|
| 2012/0052341 A1* | 3/2012 | Kim | H01M 2/043 |
| | | | 429/53 |
| 2012/0214050 A1 | 8/2012 | Kim | |
| 2012/0308855 A1 | 12/2012 | Shimizu et al. | |
| 2013/0029188 A1 | 1/2013 | Kim et al. | |
| 2013/0078505 A1 | 3/2013 | Kim et al. | |
| 2015/0147636 A1 | 5/2015 | Kim | |
| 2015/0263330 A1* | 9/2015 | Seo | H01M 2/345 |
| | | | 429/7 |
| 2015/0340663 A1* | 11/2015 | Minagata | H01M 2/0237 |
| | | | 429/163 |
| 2016/0099444 A1 | 4/2016 | Park et al. | |
| 2016/0336574 A1 | 11/2016 | Guen et al. | |

FOREIGN PATENT DOCUMENTS

| | | | | |
|---|---|---|---|---|
| JP | 2013-025882 | | 2/2013 | |
| JP | WO 2014002647 A1 * | | 1/2014 | H01M 2/0237 |
| JP | 2014-192106 A | | 10/2014 | |
| KR | 10-2007-0100978 A | | 10/2007 | |
| KR | 10-2008-0037869 A | | 5/2008 | |
| KR | 10-2008-0066314 A | | 7/2008 | |
| KR | 10-2011-0060782 A | | 6/2011 | |
| KR | 10-2012-0006234 A | | 1/2012 | |
| KR | 10-2012-0024412 A | | 3/2012 | |
| KR | 10-2013-0012539 A | | 2/2013 | |
| KR | 10-2014-0017743 A | | 2/2014 | |

OTHER PUBLICATIONS

USPTO Office action dated Feb. 26, 2018, in U.S. Appl. No. 15/227,833.
USPTO Office action dated Jan. 20, 2017, in U.S. Appl. No. 14/733,584.
USPTO Office action dated May 25, 2017, in U.S. Appl. No. 14/733,584.
USPTO Office action dated Dec. 18, 2017, in U.S. Appl. No. 14/733,584.
USPTO Office action dated May 19, 2017, in U.S. Appl. No. 14/733,437.

* cited by examiner

SECONDARY BATTERY

CROSS-REFERENCE TO RELATED APPLICATION

Korean Patent Application No. 10-2015-0067956, filed on May 15, 2015, in the Korean Intellectual Property Office, and entitled: "Secondary Battery," is incorporated by reference herein in its entirety.

BACKGROUND

1. Field

Embodiments relate to a secondary battery.

2. Description of the Related Art

Unlike primary batteries which may not be recharged, rechargeable secondary batteries may be repeatedly charged and discharged. Low capacity batteries that use single battery cells may be used as power sources for various small portable electronic devices such as cellular phones, notebook computers, and camcorders. High power batteries may be used as power sources for driving, for example, hybrid vehicles or electric vehicles.

SUMMARY

Embodiments may be realized by providing a secondary battery, including a case including an internal space; an electrode assembly in the case, the electrode assembly having a current collection tab drawn from a positive electrode plate, a current collection tab drawn from a negative electrode plate, and a separator between the positive electrode plate and the negative electrode plate; an electrode terminal electrically connected to each of the current collection tabs; an insulation plate between the electrode assembly and the electrode terminal; and a cap plate exposing the electrode terminal, the cap plate sealing the case, the insulation plate including one or more protrusions on a surface facing the cap plate.

The insulation plate may include a central region higher than opposite edges, and the protrusions may be in the central region.

The protrusions may have a height corresponding to a height difference between the central region and the opposite edges.

The insulation plate may include a support member at the opposite edges or the central region of the insulation plate.

The protrusions may extend from a bottom surface of the insulation plate and are in contact with the electrode assembly.

The protrusions may have a height in a range between 1.0 mm and 1.2 mm.

The protrusions may be at a position corresponding to at least one of the current collection tabs.

The protrusions may have different heights according to polarities of the current collection tabs.

A height of the protrusion corresponding to the current collection tab drawn from the positive electrode plate may be in a range between 0.4 mm and 0.6 mm.

A height of the protrusion corresponding to the current collection tab drawn from the negative electrode plate may be in a range between 0.6 mm and 0.8 mm.

The current collection tab drawn from the positive electrode plate may include multiple current collection tabs drawn from the positive electrode plate; and the current collection tab drawn from the negative electrode plate may include multiple current collection tabs drawn from the negative electrode plate.

A plurality of the multiple current collection tabs drawn from the positive electrode plate may be bent from a top portion of the insulation plate and electrically connected to the corresponding electrode terminal; and a plurality of the multiple current collection tabs drawn from the negative electrode plate may be bent from a top portion of the insulation plate and electrically connected to the corresponding electrode terminal.

The protrusions may extend in a direction perpendicular to a lengthwise direction of the insulation plate.

The secondary battery may further include a pair of lead tabs on the insulation plate. One of the current collection tabs of the electrode assembly may be electrically connected to a first end of one of the lead tabs.

A second end of each of the lead tabs may be electrically connected to one of the electrode terminals.

The insulation plate may include hook portions at opposite sides of the insulation plate, and the hook portions may be physically connected to coupling holes of gaskets.

BRIEF DESCRIPTION OF THE DRAWINGS

Features will become apparent to those of skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of features may be exaggerated for clarity of illustration. Like reference numerals refer to like elements throughout.

Figure 1:
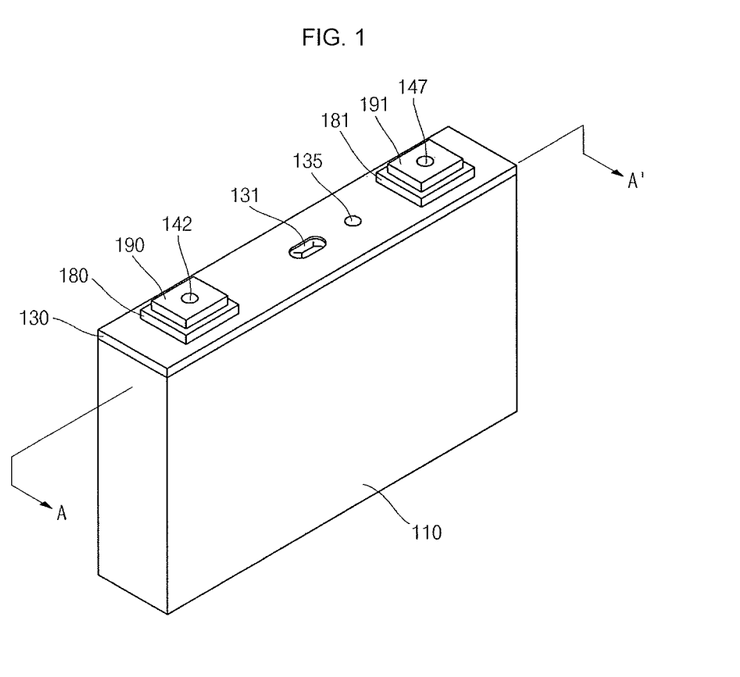
FIG. 1 illustrates a perspective view of a secondary battery according to an embodiment.
Figure 2:
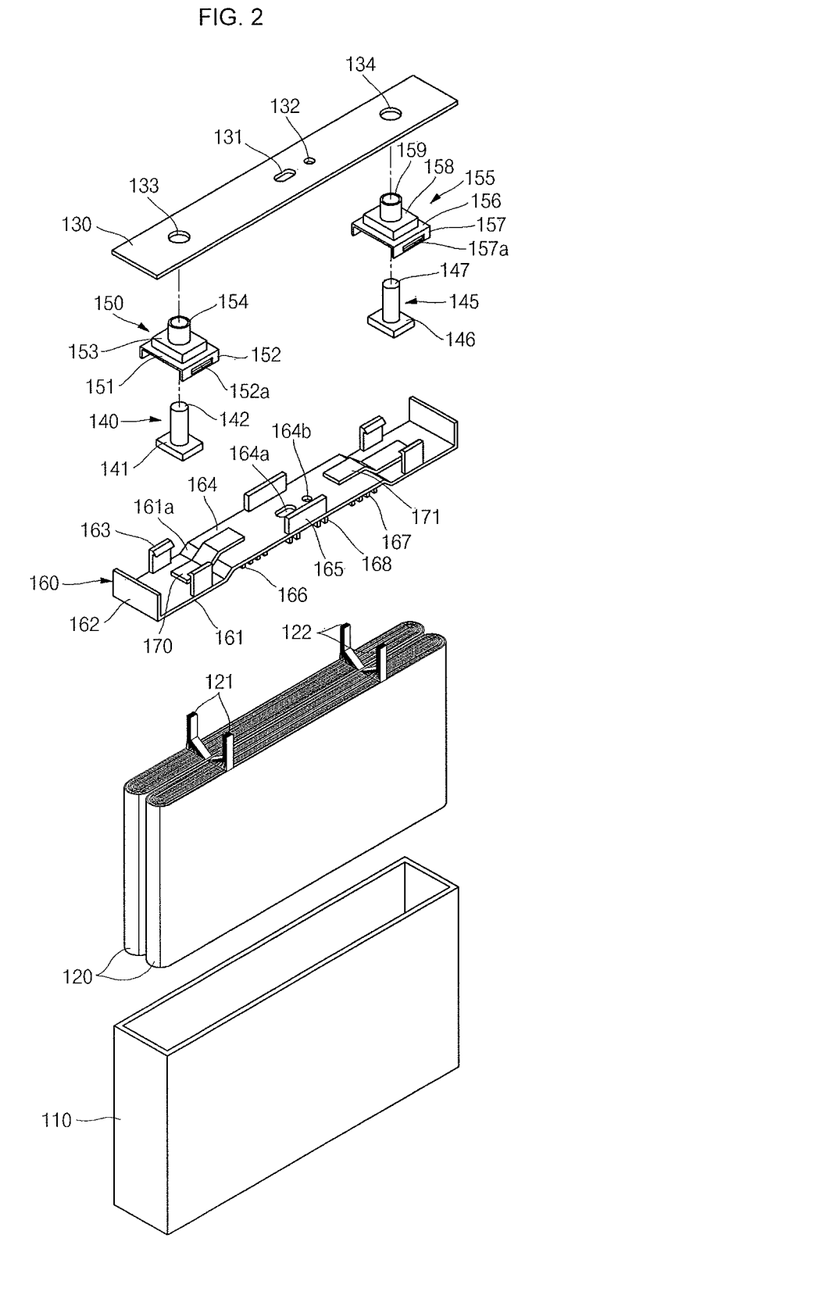
FIG. 2 illustrates an exploded perspective view of the secondary battery shown in FIG. 1.
Figure 3:
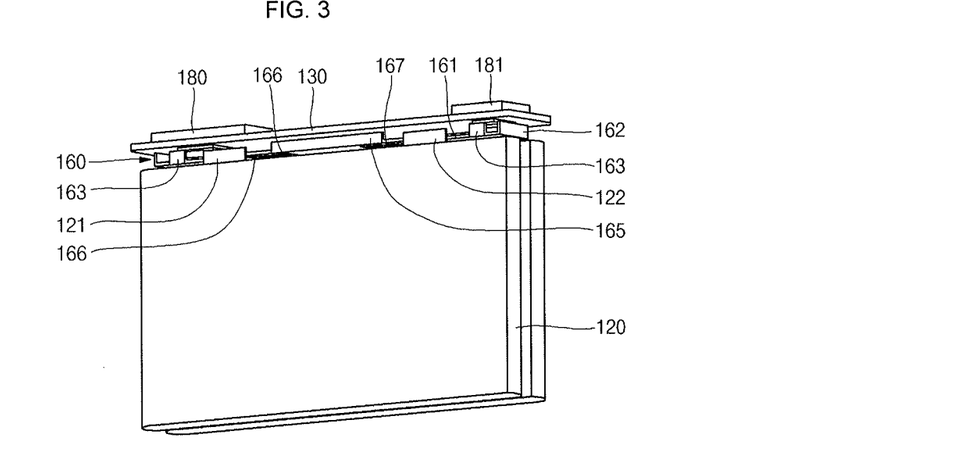
FIG. 3 illustrates a state in which an electrode assembly and a cap plate are combined with each other in the secondary battery shown in FIG. 1.
Figure 4:
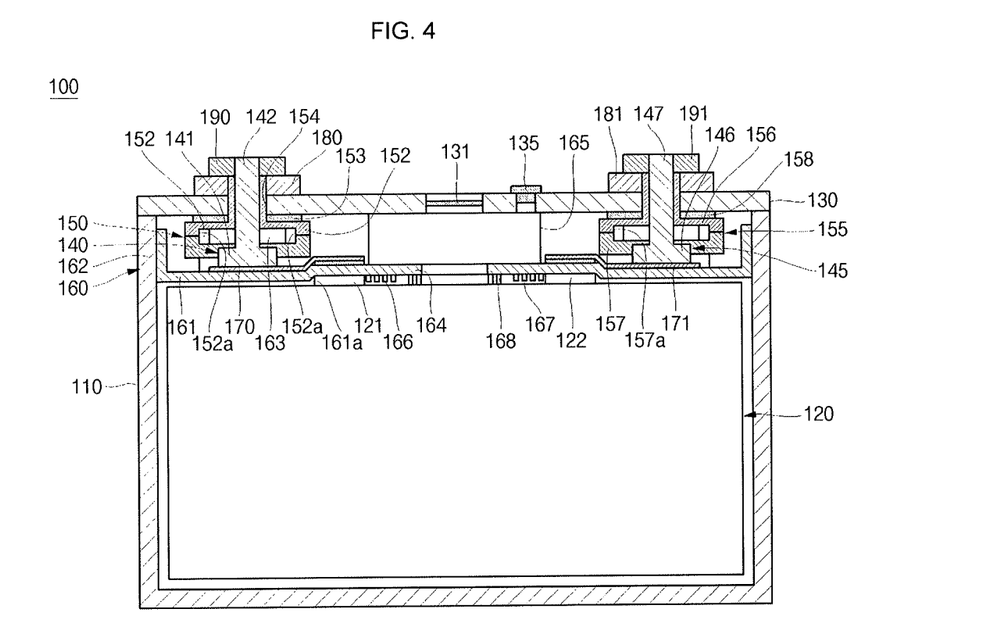
FIG. 4 illustrates a cross-sectional view taken along the line A-N of FIG. 1.
Figure 5:
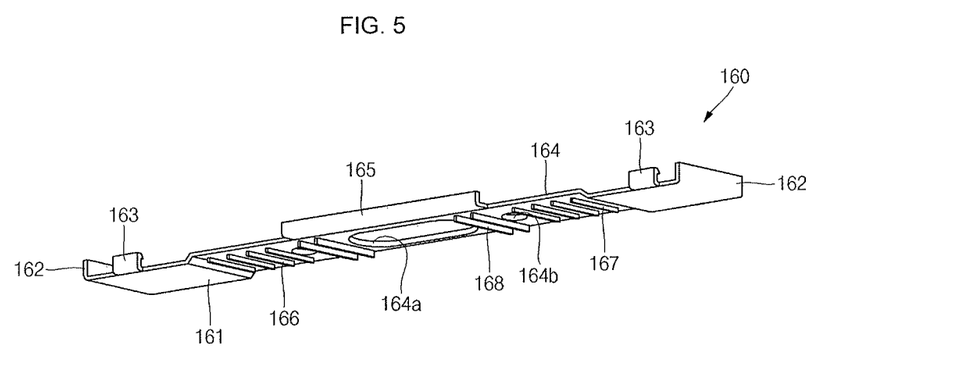
FIG. 5 illustrates a perspective view of an insulation plate of the secondary battery shown in FIG. 1.
Figure 6:
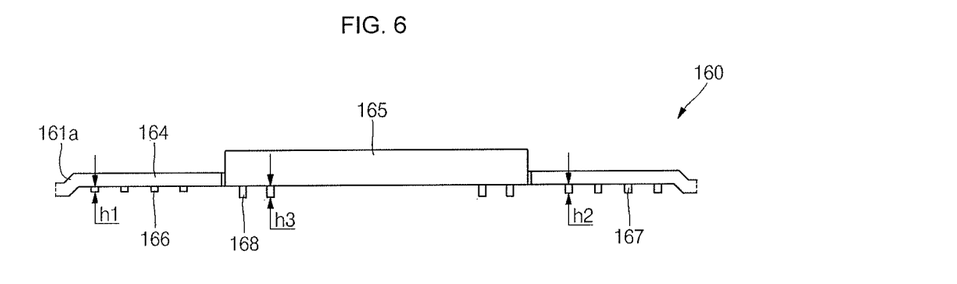
FIG. 6 illustrates a front view of the insulation plate shown in FIG. 5.

FIG. 1 illustrates a perspective view of a secondary battery according to an embodiment, FIG. 2 illustrates an exploded perspective view of the secondary battery shown in FIG. 1, FIG. 3 illustrates a state in which an electrode assembly and a cap plate are combined with each other in the secondary battery shown in FIG. 1, FIG. 4 illustrates a cross-sectional view taken along the line A-A' of FIG. 1, FIG. 5 illustrates a perspective view of an insulation plate of the secondary battery shown in FIG. 1, and FIG. 6 illustrates a front view of the insulation plate shown in FIG. 5.

Referring to FIGS. 1 to 6, the secondary battery 100 according to an embodiment may include a case 110, an electrode assembly 120 accommodated in the case 110, a cap plate 130 sealing the case 110, electrode terminals 140 and 145 electrically connected to the electrode assembly 120, gaskets 150 and 155 positioned between the electrode terminals 140 and 145 and the cap plate 130, an insulation plate 160 positioned between the electrode terminals 140 and 145 and the electrode assembly 120, lead tabs 170 and 171 formed in the insulation plate 160 and forming connection paths between the electrode terminals 140 and 145 and the electrode assembly 120, and insulation members 180 and 181 and terminal plates 190 and 191 formed on the cap plate 130.

The case 110 may be made of a conductive metal, such as aluminum, an aluminum alloy or nickel plated steel, and may have an approximately hexahedral shape with a top opening, and the electrode assembly 120 may be inserted and placed therein. A peripheral portion of the case 110 being in contact with the cap plate 130 may be a substantially opened portion.

The inner surface of the case 110 may be subjected to insulation treatment, and internal electrical shorts may be prevented from occurring in the case 110. One electrode of the electrode assembly 120 may be electrically connected to the case 110 through the cap plate 131. Internal electrical shorts may be prevented by the insulation treatment of the inner surface of the case 110.

The electrode assembly 120 may be formed by winding or laminating a stacked structure including a first electrode plate, a separator and a second electrode plate, which may be thin plates or layers. The first electrode plate may function as a positive electrode and the second electrode plate may function as a negative electrode. The first electrode plate and the second electrode plate having different polarities may be arranged according to the choice of one skilled in the art.

The first electrode plate may be formed by coating a first electrode active material on a first electrode collector made of, for example, an aluminum (Al) foil and may include a first electrode uncoated portion on which the first electrode active material is not applied. The first electrode uncoated portion may provide a passage for current flowing between the first electrode plate and the outside of the first electrode plate.

The first electrode uncoated portion may form a first current collection tab 121. The first current collection tab 121 may include a plurality of first current collection tabs, which may protrude from the first electrode uncoated portion. The first current collection tabs may form a multi-tab structure configured, and the plurality of first current collection tabs may overlap each other at a predetermined position when the first electrode plate is wound. The first electrode plate may be wound in a state in which the plurality of first current collection tabs are arranged to be spaced a predetermined distance apart from each other. The first current collection tabs may be integrally formed with the first electrode plate and may be drawn from the wound first electrode plate, and current collecting efficiency of the electrode assembly 120 may be advantageously increased. In an embodiment, the first current collection tab 121 may be formed using a separate member different from the first electrode plate.

The second electrode plate may be formed by coating a second negative electrode active material made of graphite or carbon on a second electrode collector formed of a metal foil made of copper (Cu) or nickel (Ni), and may include a second electrode uncoated portion on which the negative electrode active material is not applied.

A second current collection tab 122 may be formed from the second electrode uncoated portion so as to correspond to the first current collection tab 121. Unlike the first current collection tab 121, the second current collection tab 122 may also be formed by winding the second electrode plate in a state in which a plurality of second current collection tabs are spaced apart from each other and arranged on the second electrode plate.

The separator disposed between the first electrode plate and the second electrode plate may prevent electrical shorts and may allow the movement of lithium ions. The separator may be formed of, for example, polyethylene, polypropylene, or a copolymer of polypropylene and polyethylene.

The electrode assembly 120 may be accommodated in the case 110 with an electrolyte. The electrolyte may include an organic solvent, such as ethylene carbonate (EC), propylene carbonate (PC), diethyl carbonate (DEC), ethyl methyl carbonate (EMC), or dimethyl carbonate (DMC), and a lithium salt, such as $LiPF_6$, or $LiBF_4$. The electrolyte may be in a liquid, solid or gel phase. The first current collection tab 121 and the second current collection tab 122 may be electrically connected to the lead tabs 170 and 171. The first and second current collection tabs 121 and 122 being in a vertically extending state are illustrated in FIG. 2. The electrode assembly 120 having such a configuration as shown in FIGS. 3 and 4 may be completed by ultrasonic welding the first and second current collection tabs 121 and 122 to the lead tabs 170 and 171, inserting the insulation plate 160 into a lower portion of the electrode assembly 120 and bending the first and second current collection tabs 121 and 122 by approximately 90 degrees.

The cap plate 130 may be provided in the form of a plate and may seal the opening of the case 110. The cap plate 130 and the case 110 may be made of the same material. The cap plate 130 may be coupled to the case 110 by laser welding. The cap plate 130 may be electrically independent or may be electrically connected to one of the first current collection tabs 121 or the second current collection tab 122. For example, the cap plate 130 may be electrically connected to the first current collection tab 121. The cap plate 130 and the case 110 may have the same polarity, i.e., a first polarity. The cap plate 130 may also be electrically connected to the second current collection tab 122.

The cap plate 130 may include a safety vent 131 formed at a roughly central region, and may have a smaller thickness than other regions. When the internal pressure of the secondary battery 100 is higher than a preset pressure, the safety vent 131 may be opened earlier than the other region, and the secondary battery 100 may be prevented from exploding.

The cap plate 130 may include an injection hole 132 formed in at least one side to inject an electrolyte. The electrolyte may be injected into the cap plate 130 through the injection hole 132 and the injection hole 132 may then be sealed by an injection plug 135.

The cap plate 130 may include through-holes 133 and 134 formed at opposite sides to allow the electrode terminals 140 and 145 to pass therethrough. The electrode terminals 140 and 145 may be exposed to a top portion of the cap plate 130 via the through-holes 133 and 134, and may then be connected to the terminal plates 190 and 191.

The electrode terminals 140 and 145 may be electrically connected to the first current collection tab 121 and the second current collection tab 122 of the electrode assembly 120, respectively. Of the electrode terminals 140 and 145, the first electrode terminal 140 may be coupled to the lead tab 170 connected to the first current collection tab 121, and the second electrode terminal 145 may be coupled to the lead tab 171 connected to the second current collection tab 122. The coupling may be performed using ultrasonic welding.

The first electrode terminal 140 may include a body part 141 to be coupled to the lead tab 170 and a terminal part 142 vertically protruding from the body part 141. The terminal part 142 may be formed to a height at which it may be exposed to the outside of the cap plate 130. The second electrode terminal 145 may include a body part 146 and a terminal part 147 corresponding to those of the first electrode terminal 140.

The gaskets 150 and 155 may be positioned between the electrode terminals 140 and 145 and the cap plate 130. The gaskets 150 and 155 may be formed to cover the body parts 141 and 146 of the electrode terminals 140 and 145 and the terminal units 142 and 147 may pass through the gaskets 150 and 155. The gaskets 150 and 155 may include plate units 151 and 156 formed to be planar, cover units 152 and 157 formed vertically downward from the plate units 151 and 156, insulation units 153 and 158 formed on the plate units 151 and 156, and sealing units 154 and 159 formed vertically upward from the insulation units 153 and 158, respectively.

The cover units 152 and 157 may laterally cover the body parts 141 and 146 of the electrode terminals 140 and 145. The cover units 152 and 157 may include one or more coupling holes 152a and 158a formed therein. Hook portions 163 of the insulation plate 160, which will later be described, may be engaged with the coupling holes 152a and 158a, and the gaskets 150 and 155 and the insulation plate 160 may be maintained in a state in which they are coupled to each other.

The insulation units 153 and 158 may be formed to make close contact with a bottom surface of the cap plate 130. The insulation units 153 and 158 may be fixed in a state in which the electrode terminals 140 and 145 may be insulated from the cap plate 130.

The sealing units 154 and 159 may be formed to pass through the through-holes 133 and 134 of the cap plate 130. The terminal units 142 and 147 of the electrode terminals 140 and 145 may pass through the sealing units 154 and 159 and the insulation units 153 and 158 through internal holes and the sealing units 154 and 159 may pass through the through-holes 133 and 134 of the cap plate 130 while covering the terminal units 142 and 147. The terminal units 142 and 147 of the electrode terminals 140 and 145 may be electrically insulated from the cap plate 130.

The insulation plate 160 may be positioned between the electrode terminals 140 and 145 and the electrode assembly 120. The insulation plate 160 may protect the electrode assembly 120. For example, in a case where the cap plate 120 undergoes an internal distort, it may be possible to prevent the electrode assembly 120 from being damaged. The insulation plate 160 may fix a position of the electrode assembly 120 inside the case 110 and may be electrically independent of the cap plate 130. An additional insulation plate in addition to the insulation plate 160 may further be formed on the electrode terminals 140 and 145.

The insulation plate 160 may include a pair of plate regions 161 formed as plates at opposite edges, a pair of first support regions 162 protruding at lengthwise ends of the plate regions 161, two pairs of hook units 163 arranged in a lengthwise direction of the plate regions 161, a central region 164 positioned between the plate regions 161 and connected to inclined surfaces 161a of the plate regions 161 to be positioned higher than the plate regions 161, and a pair of second support regions 165 formed in a lengthwise direction of the central region 164.

The first support regions 162 and the second support regions 165 may be formed to have heights sufficient to contact the cap plate 130, and a position of the insulation plate 160 between the cap plate 130 and the electrode assembly 120 may be fixed.

The hook portions 163 may be engaged with the coupling holes 152a and 157a of the gaskets 150 and 155. The insulation plate 160 may stably maintain a state in which they may be coupled to the gaskets 150 and 155 through the engagement.

The central region 164 may be positioned to be higher than the plate regions 161, for example, due to presence of the inclined surfaces 161a, and the central region 164 may be positioned to correspond to bent heights of the first and second current collection tabs 121 and 122 formed in the electrode assembly 120. Top ends of the first and second current collection tabs 121 and 122 may be bent from the outside to the inside of the insulation plate 160 by approximately 90 degrees and may then be subjected to ultrasonic welding with the lead tabs 170 and 171 formed in the insulation plate 160. The current collection tabs 121 and 122 may maintain a state in which they may be coupled to the lead tabs 170 and 171 at a higher position than the other region of the electrode assembly 120, the central region 164 may be positioned to be higher than the plate regions 161, and the height difference may be corrected. The central region 164 may include a vent hole 164a formed at a position corresponding to the safety vent 131 of the cap plate 130 and an injection hole 164b formed at a position corresponding to the injection hole 132.

A plurality of protrusions 166, 167 and 168 may be formed on a bottom surface of the central region 164. The protrusions 166, 167 and 168 may include a plurality of first protrusions 166 and a plurality of second protrusions 167 formed at opposite sides of the central region 164, and a plurality of third protrusions 168 formed at the center of the central region 164, respectively.

The first protrusions 166 may be provided at positions corresponding to the first current collection tab 121 of the electrode assembly 120. The first protrusions 166 may protect a welded portion of the first current collection tab 121 and the lead tab 170. The welded portion may vibrate slightly, for example, due to internal vibration of the secondary battery 100, and the first protrusions 166 may fix the welded portion by restricting a displacement of the welded portion. Even if the welded portion of the first current collection tab 121 vibrates, for example, due to internal vibration, it may be possible to prevent the first current collection tab 121 from being damaged, for example, due to cracks generated by the first protrusions 166, and stability of the secondary battery may be increased. The first current collection tab 121 made of an aluminum material may be more flexible than the second current collection tab 122. The first protrusions 166 may be formed to have a height h1 in a range between 0.3 mm and 0.6 mm. If the height h1 of each of the first protrusions 166 is 0.3 mm or greater, the displacement of the first current collection tab 121 may be sufficiently restricted, and the first current collection tab 121 may be prevented from being damaged. If the height h1 of each of the first protrusions 166 is 0.6 mm or less, welding of the first current collection tab 121 may be easily achieved.

The second protrusions 167 may be provided at positions corresponding to the second current collection tab 122 of the electrode assembly 120. The second protrusions 167 may protect a welded portion of the second current collection tab 122 and the lead tab 170. The second current collection tab 122 made of a copper material may have a higher strength than the first current collection tabs 121. The second protrusions 167 may be formed to have a height h2 in a range between 0.6 mm and 0.8 mm. If the height h2 of each of the second protrusions 167 is 0.6 mm or greater, the displacement of the second current collection tab 122 may be sufficiently restricted, and the second current collection tab 122 may be prevented from being damaged. If the height h2 of each of the second protrusions 167 is 0.8 mm or less, welding of the second current collection tab 122 may be easily achieved.

The third protrusions 168 may be formed to roughly contact the electrode assembly 120. The third protrusions 168 may be formed to have a height h3 corresponding to a height difference between the plate regions 161 and the central region 164 of the insulation plate 160. The plate regions 161n and the third protrusion 168 may be formed to make contact with the electrode assembly 120, and a stably coupled state may be maintained. The height h3 of each of the third protrusions 168 may be in a range between 1 mm and 1.2 mm in consideration of an allowance.

The lead tabs 170 and 171 may be provided in a pair and may be formed on the insulation plate 160. The lead tabs 170 and 171 may be formed to extend from the plate regions 161 to the central region 164 of the insulation plate 160 along the inclined surfaces 161a. The lead tabs 170 and 171 may be coupled to the current collection tabs 121 and 122 by welding first ends of the lead tabs 170 and 171 positioned corresponding to the central region 164 to the bent current collection tabs 121 and 122. The lead tabs 170 and 171 may be electrically connected to the current collection tabs 121 and 122. The lead tabs 170 and 171 may be coupled to the electrode terminals 140 and 145 by welding second ends of the lead tabs 170 and 171 positioned corresponding to the plate regions 161 to the body parts 141 and 146. The lead tabs 170 and 171 may establish electrical paths between the current collection tabs 121 and 122 and the electrode terminals 140 and 145.

The insulation members 180 and 181 may be formed on the cap plate 130. The insulation members 180 and 181 may insulate the cap plate 130 from the terminal plates 190 and 191, respectively. The sealing units 154 and 159 of the gasket 150 and the terminal units 142 and 147 of the electrode terminal 140 may pass through the insulation members 180 and 181 via through-holes formed therein.

Additional engagement protrusions may further be formed on bottom surfaces of the insulation members 180 and 181, and a state in which the insulation members 180 and 181 are fixed to the cap plate 130 may be maintained.

The terminal plates 190 and 191 may be formed on the insulation members 180 and 181. The terminal plates 190 and 191 may be coupled to the terminal units 142 and 147 of the electrode terminal 140 exposed by the through-holes. The terminal units 142 and 147 may be coupled to the terminal plates 190 and 191 by riveting or welding. The electrode plates of the electrode assembly 120 may perform charging and discharging operations with respect to an external device through the terminal plates 190 and 191.

As described above, the secondary battery 100 according to an embodiment may include protrusions 166, 167, and 168 on a bottom surface of the insulation plate 160 to fix a position of the electrode assembly 130, and internal vibration may be reduced. Displacements of welded portions between the current collection tabs 121 and 122 and the lead tab 170 may be restricted to prevent the welded portions from being damaged, and stability and reliability of the secondary battery 100 may be increased.

By way of summation and review, a secondary battery may include an electrode assembly for charging and discharging, a case accommodating the electrode assembly, a cap plate coupled to an opening of the case, and an electrode terminal through which the electrode assembly is drawn to the outside of the cap plate.

High-capacity batteries may be formed. For example, a process may form multi-tabs from an uncoated portion of the electrode assembly. However, the multi-tabs may result in welding failures or structural weakness, for example, due to their thicknesses.

Embodiments relate to a secondary battery, which may prevent welded portions of multi-tabs of an electrode assembly from being damaged.

As described above, in the secondary battery according to an embodiment, protrusions may be provided on a bottom surface of an insulation plate, and internal vibration may be reduced by fixing a position of an electrode assembly. Displacement of a welded portion between a current collection tab and a lead tab, for example, due to the internal vibration, may be reduced to prevent the welded portion from being damaged, and stability and reliability of the secondary battery may be increased.

Example embodiments have been disclosed herein, and although specific terms are employed, they are used and are to be interpreted in a generic and descriptive sense only and not for purpose of limitation. In some instances, as would be apparent to one of skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A secondary battery, comprising:
    a case including an internal space;
    an electrode assembly in the case, the electrode assembly having a first current collection tab drawn from a positive electrode plate, a second current collection tab drawn from a negative electrode plate, and a separator between the positive electrode plate and the negative electrode plate;
    a first electrode terminal electrically connected to the first current collection tab, and a second electrode terminal electrically connected to the second current collection tab, the first electrode terminal and the second electrode terminal being spaced apart in a first direction;
    an insulation plate having a length extending in the first direction, the insulation plate being interposed between the electrode assembly and the first and second electrode terminals; and
    a cap plate over the insulation plate and exposing the electrode terminals, the cap plate sealing the case, wherein:
    the insulation plate includes protrusions that extend along a width of the insulation plate in a second direction, perpendicular to the first direction, each of the protrusions having a height protruding toward the electrode assembly from a bottom surface of the insulation plate in a third direction, perpendicular to the first and second directions, the protrusions include a first group of protrusions in a central region of the insulation plate, the first group of protrusions having end portions that contact the electrode assembly at a central region thereof between the first and second current collecting tabs, and the end portions of the protrusions each have a length and a width, the length being greater than the width and extending in the second direction.

2. The secondary battery as claimed in claim 1, wherein the central region is higher than opposite edges.

3. The secondary battery as claimed in claim 2, wherein the first group of protrusions have a height corresponding to a height difference between the central region and the opposite edges.

4. The secondary battery as claimed in claim 2, wherein the insulation plate includes a support at the opposite edges or the central region of the insulation plate.

5. The secondary battery as claimed in claim 1, wherein the first group of protrusions have a height in a range between 1.0 mm and 1.2 mm.

6. The secondary battery as claimed in claim 1, wherein:
the insulation plate includes hook portions at opposite sides of the insulation plate, and
the hook portions are physically connected to coupling holes of gaskets.

7. The secondary battery as claimed in claim 1, further comprising:
a first lead tab formed in the insulation plate, the first lead tab being located at a top surface of the insulation plate such that the insulation plate is interposed between the first lead tab and the electrode assembly,
wherein:
the first current collection tab of the electrode assembly extends across the top surface of the insulation plate and is electrically connected to a first end of the first lead tab, and
the protrusions includes the first group of protrusions and a second group of protrusions, the second group of protrusions being proximate to the first lead tab, and
the first group of protrusions has a first height in the third direction, the second group of protrusions has a second height in the third direction, and the first height is greater than the second height.

8. The secondary battery as claimed in claim 7, wherein:
a second lead tab is formed in the insulation plate at a top surface of the insulation plate, the first and second lead tabs being spaced apart in the first direction,
the protrusions are at a position corresponding to at least one of the current collection tabs include a third group of protrusions proximate to the second lead tab.

9. The secondary battery as claimed in claim 8, wherein the second and third groups of protrusions have different heights according to polarities of the current collection tabs.

10. The secondary battery as claimed in claim 9, wherein one of the second and third groups of protrusions has a height in a range between 0.4 mm and 0.6 mm, and the other of the second and third groups of protrusions has a height in a range between 0.6 mm and 0.8 mm.

11. The secondary battery as claimed in claim 8, wherein:
the first current collection tab includes a first group of current collection tabs drawn from the positive electrode plate; and
the second current collection tab includes a second group of current collection tabs drawn from the negative electrode plate.

12. The secondary battery as claimed in claim 11, wherein:
the first group of current collection tabs drawn from the positive electrode plate is bent to extend across the top surface of the insulation plate, and is electrically connected to the first lead tab by a weld; and
the second group of current collection tabs drawn from the negative electrode plate is bent to extend across the top surface of the insulation plate, and is electrically connected to the lead tab by a weld.

13. The secondary battery as claimed in claim 8, wherein a second end of each of the first and second lead tabs is electrically connected to one of the first and second electrode terminals.

* * * * *